United States Patent
Rue

(10) Patent No.: US 7,433,669 B2
(45) Date of Patent: Oct. 7, 2008

(54) METHOD AND SYSTEM FOR PERFORMING DATA TRANSMISSION PROCESS OF AN ACCESS POINT (AP) SUPPORTING POWER MANAGEMENT OF WIRELESS LOCAL AREA NETWORK (WLAN) CLIENTS, AND AP FOR PERFORMING THE SAME

(75) Inventor: Seon-Soo Rue, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 696 days.

(21) Appl. No.: 10/876,643

(22) Filed: Jun. 28, 2004

(65) Prior Publication Data
US 2005/0009512 A1  Jan. 13, 2005

(30) Foreign Application Priority Data
Jun. 30, 2003  (KR)  ............... 10-2003-0043531

(51) Int. Cl.
H04B 1/16  (2006.01)
(52) U.S. Cl. ............... 455/343.2; 455/574; 455/420; 455/69
(58) Field of Classification Search ............... 455/420, 455/434, 550.1, 572, 574, 450, 343.1, 343.2, 455/343.3, 343.4, 343.5, 67.11, 127.1, 127.5, 455/186.1, 418, 13.4, 69, 573, 419, 515, 455/452.1; 370/328, 278, 349, 338
See application file for complete search history.

(56) References Cited
U.S. PATENT DOCUMENTS

| | | | |
|---|---|---|---|
| 5,450,616 A | 9/1995 | Rom | |
| 5,465,392 A | 11/1995 | Baptist et al. | |
| 5,636,220 A | 6/1997 | Vook et al. | |
| 6,018,642 A | 1/2000 | Adachi | |
| 6,067,297 A | 5/2000 | Beach | |
| 6,192,230 B1 * | 2/2001 | van Bokhorst et al. | ... 455/343.3 |
| 6,292,508 B1 * | 9/2001 | Hong et al. | ................. 455/574 |
| 6,707,867 B2 | 3/2004 | Diepstraten et al. | |

(Continued)

OTHER PUBLICATIONS

Search Report under Section 17 from the British Patent Office issued in Applicant's corresponding British Patent Application No. GB0412777.5 (dated Nov. 8, 2004).

Primary Examiner—John J. Lee
(74) Attorney, Agent, or Firm—Robert E. Bushnell, Esq.

(57) ABSTRACT

A method and system or access point (AP) for performing a data transmission process supporting power management of wireless local area network (WLAN) clients comprises the steps of and means for performing the following functions, respectively: when data are received through a network, storing the data selectively, wherein the received data are not stored in a memory when a current operation timing is in a first timing interval, and the received data are stored in the memory when the current operation timing is in a second timing interval; generating a beacon frame after determining whether data to be transmitted to the WLAN clients are stored in the memory according to a beacon frame generation interval; transmitting the generated beacon frame to the WLAN clients every beacon interval; and, when the transmission of data stored in the memory during the second timing interval is requested from the WLAN clients, transmitting the appropriate data to the WLAN clients. As a result, power consumption by remote stations is minimized.

20 Claims, 6 Drawing Sheets

U.S. PATENT DOCUMENTS

| | | | |
|---|---|---|---|
| 7,274,929 B1 * | 9/2007 | Banginwar | 455/418 |
| 2002/0016151 A1 | 2/2002 | Romans | |
| 2002/0034959 A1 * | 3/2002 | Jamieson et al. | 455/517 |

* cited by examiner

FIG. 3

| Type value b3 b2 | Type description | Subtype value b7 b6 b5 b4 | Subtype description |
|---|---|---|---|
| 00 | Management | 0000 | Association request |
| 00 | Management | 0001 | Association response |
| 00 | Management | 0010 | Reassociation request |
| 00 | Management | 0011 | Reassociation response |
| 00 | Management | 0100 | Probe request |
| 00 | Management | 0101 | Probe response |
| 00 | Management | 0110–0111 | Reserved |
| 00 | Management | 1000 | Beacon |
| 00 | Management | 1001 | Announcement traffic indication message (ATIM) |
| 00 | Management | 1010 | Disassociation |
| 00 | Management | 1011 | Authentication |
| 00 | Management | 1100 | Deauthentication |
| 00 | Management | 1101–1111 | Reserved |
| 01 | Control | 0000–1001 | Reserved |
| 01 | Control | 1010 | Power Save (PS)-Poll |
| 01 | Control | 1011 | Request To Send (RTS) |
| 01 | Control | 1100 | Clear To Send (CTS) |
| 01 | Control | 1101 | Acknowledgment (ACK) |
| 01 | Control | 1110 | Contention-Free (CF)-End |
| 01 | Control | 1111 | CF-End + CF-Ack |
| 10 | Data | 0000 | Data |
| 10 | Data | 0001 | Data + CF-Ack |
| 10 | Data | 0010 | Data + CF-Poll |
| 10 | Data | 0011 | Data + CF-Ack + CF-Poll |
| 10 | Data | 0100 | Null function (no data) |
| 10 | Data | 0101 | CF-Ack (no data) |
| 10 | Data | 0110 | CF-Poll (no data) |
| 10 | Data | 0111 | CF-Ack + CF-Poll (no data) |
| 10 | Data | 1000–1111 | Reserved |
| 11 | Reserved | 0000–1111 | Reserved |

FIG. 4

| Order | Information | Notes |
|---|---|---|
| 1 | Timestamp | |
| 2 | Beacon interval | |
| 3 | Capability information | |
| 4 | SSID | |
| 5 | Supported rates | |
| 6 | FH Parameter Set | The FH Parameter Set information element is present within Beacon frames generated by STAs using frequency-hopping PHYs. |
| 7 | DS Parameter Set | The DS Parameter Set information element is present within Beacon frames generated by STAs using direct sequence PHYs. |
| 8 | CF Parameter Set | The CF Parameter Set information element is only present within Beacon frames generated by APs supporting a PCF. |
| 9 | IBSS Parameter Set | The IBSS Parameter Set information element is only present within Beacon frames generated by STAs in an IBSS. |
| 10 | TIM | The TIM information element is only present within Beacon frames generated by APs. |

FIG. 5

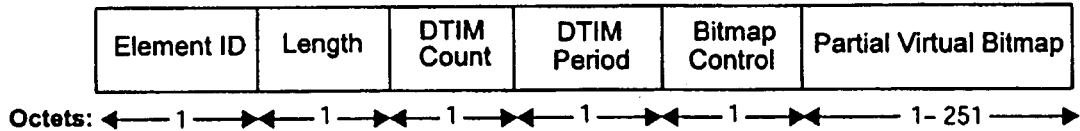

METHOD AND SYSTEM FOR PERFORMING DATA TRANSMISSION PROCESS OF AN ACCESS POINT (AP) SUPPORTING POWER MANAGEMENT OF WIRELESS LOCAL AREA NETWORK (WLAN) CLIENTS, AND AP FOR PERFORMING THE SAME

CLAIM OF PRIORITY

This application makes reference to, incorporates the same herein, and claims all benefits accruing under 35 U.S.C. § 119 from an application entitled METHOD FOR PERFORMING DATA TRANSMISSION PROCESS OF AP SUPPORTING POWER MANAGEMENT OF WLAN CLIENT AND AP FOR PERFORMING THE SAME earlier filed in the Korean Intellectual Property Office on 30 Jun. 2003 and thereby duly assigned Ser. No. 2003-43531.

BACKGROUND OF THE INVENTION

1. Technical Field

The present invention relates to a method for performing a data transmission process of an access point (AP) supporting power management of a wireless local area network (WLAN) client, and an AP for performing the same. In particular, the present invention relates to a method for performing a data transmission process of an AP supporting power management of a WLAN client, and an AP for performing the same wherein the power consumption of the WLAN client due to its mobility is minimized.

2. Related Art

A local area network (LAN) can be classified as a wired LAN or a wireless LAN, the most difference between them being determined by whether the LAN has a cable or not.

The WLAN is a network in which communication is performed in the network using a radio wave instead of a cable. The WLAN appeared as an alternative plan for solving problems relating to installation, maintenance and mobility due to cabling, and its necessity is on the increase as the number of mobile users increases.

The WLAN includes an access point (AP) and a WLAN card. The AP is an apparatus for sending out a radio wave so as to enable WLAN users within a transmission distance to perform Internet accesses and networking. The AP acts as a base station for mobile phones or as a hub for wired network subscribers. The ultra high-speed wireless Internet service provided by some Internet service providers also has the AP in its service region.

Users have to install a WLAN card in their terminals, such as a PC (notebook) or a PDA, in order to perform radio network communication. Hereinafter, such radio LAN terminals are referred to as stations (STAs).

IEEE 802.11 adopts, as a WLAN standard, the currently used 1999 Edition of "Standard for Information Technology-Telecommunications and Information Exchange between Systems—Local and Metropolitan Area Networks-specific Requirements—Part 11: Wireless LAN Medium Access Control (MAC) and Physical Layer (PHY) Specifications".

The IEEE 802.11 standard defines the requirements for physical layers forming the WLAN and Medium Access Control (MAC). The MAC layer defines an order and a rule which a terminal or an apparatus using a shared medium has to observe when it uses/accesses a medium so that the users can make efficient use of the capacity of the medium.

Each MAC frame of the IEEE 802.11 standard consists of a MAC header, a frame body having information specific to frame types, and a frame check sequence.

The MAC header consists of a frame control field, a duration field, an address field, and a sequence control field. The frame control field is a field indicating a property of the field, and it is possible to get information as to the property of the frame and the power management by analyzing the frame control field. Accordingly, the AP and the STA can identify the state of the other party by analyzing the frame control field among the frames that are sent out and received with each other.

The frame control field consists of a protocol version field, a type field, a subtype field, a To DS field, a From DS field, a More Fragments field, a Retry field, a Power management field, a More Data field, a Wired Equipment Privacy (WEP) field, and an Order field.

Among the fields, the type field is formed of 2 bits, and the subtype field is formed of 4 bits. The type and subtype fields indicate the property of the frame. That is, each frame is mainly divided into a control frame, a data frame and a management frame in view of its property.

In accordance with values established in the type field and the subtype field, it is possible to identify the function of each frame.

Among them, when the value of the type field is '00' and the value of the subtype field is '1000', the frame is identified as a Beacon frame.

The Beacon frame includes information as to a time stamp, a beacon interval, capability information, an SSID, supported rates, an FH parameter set, a DS parameter set, a CF parameter set, an IBSS parameter set, and a TIM (Traffic Indication Map).

Each piece of information included in the beacon frame has its function. Since information included in the beacon frame is explained in the IEEE 802.11 standard, a detailed explanation of the beacon frame is omitted, and only elements of information directly related to the present invention will be explained.

The time stamp, among the information included in the beacon frame, is used to perform synchronization between an AP and each STA in the WLAN. The AP periodically transmits the beacon frame to each STA in order to synchronize each STA. A period during which the beacon frame is transmitted is called a beacon interval, and the time during which the beacon frame is transmitted is called a beacon time.

Each STA periodically receives the beacon frame from the AP, and analyzes a time stamp included in the beacon frame. In addition, the STA matches its own timer with the time stamp provided by the AP, and then updates itself. Accordingly, synchronization among STAs is performed.

On the other hand, since the main purpose of the wireless LAN is to provide a service to a mobile node, which normally depends on a battery, the efficient use of transmission and receiving power becomes an important consideration for the MAC protocol.

The IEEE 802.11 standard supports a power management mode for minimizing power consumption by the STA.

In the latter regard, each STA may be in one of two different power states, an awake state or a doze state. The awake state is a state in which the STA fully uses power, and the doze state is a state in which the STA cannot transmit or receive signals, and thus uses very little power.

Transition of the STA between the two states is determined by a power management mode of the STA.

The power management mode of the STA is divided into two modes, an active mode (AM) and a power-save mode (PM).

In the active mode, the STA is in and maintains an awake state so that it can always receive frames.

In the power-save mode, the STA maintains the doze state, transitions to the active state by supplying power just before the beacon frame is transmitted in order to listen to the frame beacon periodically transmitted from the AP, and then returns to the doze state. These processes are iterated periodically in the power-save mode.

A period during which the STA is in the awake state for a while in order to listen to the beacon frame after the STA is in the doze state by performing the power-save mode is called a listen interval.

On the other hand, the AP stores data to be transmitted to the STA operating in the power-save mode and periodically transmits the data only at a fixed time instead of transmitting the data arbitrarily.

That is, the AP transmits the beacon frame to the STA at the beacon time every beacon interval described above, the beacon frame being the data stored at the beacon time.

Accordingly, the beacon interval is identical to a listen interval. However, in order that the STA listen to the beacon frame, the STA has to maintain the awake state to some extent before the beacon time when the beacon frame is transmitted from the AP. Thus, the STA is periodically awaken from the doze state to the awake state somewhat before the beacon time.

The STA is awaken from the doze state to the awake state for a time during every listen interval, and listens to the beacon frame periodically transmitted from the AP every beacon interval. The STA also analyzes a TIM included in the beacon frame, and identifies whether or not data to be transmitted to the STA is stored in the AP.

As a result of analyzing the TIM, when the AP has data to be transmitted to the STA, the STA transmits a PS-POLL frame to the AP to request the stored data. Accordingly, the AP transmits the data of the STA stored in the AP to the STA which transmitted the PS-POLL frame to the AP.

On the other hand, as a result of analyzing the TIM, when the AP has not stored data to be transmitted to the STA, the STA returns to the doze state from the awake state.

It is because the AP has its own timer, capable of counting a beacon interval, that the AP can transmit the beacon frame to the STA every beacon interval. Also, it is because the STA has its own timer, capable of counting the listen interval, that the STA is awaken from the doze state to the awake state every listen interval.

The STA establishes its own timer again by referring to a time stamp provided by the beacon frame. Accordingly, synchronization among STAs is performed.

The AP does not transmit data to be transmitted to the STA whenever the data are generated in order to give support to the STA performing the power-save mode. At first, the AP includes information, as to the fact that the AP has data stored in it, in the beacon frame which is transmitted to the STA every beacon interval, and transmits it to the STA. The beacon frame has the TIM field for including such information.

The TIM field is a field indicating that data to be transmitted to a specific STA is stored in the AP.

Accordingly, when the AP stores data to be transmitted to the STAs, the AP informs the STA that data to be transmitted through the TIM at the beacon time are buffered.

As a result, the STAs analyze the TIM received from the AP at the beacon time. Simultaneously, the STAs operating in the power-save mode (referred to as a PS mode, hereinafter) are awaken in a listen interval time, and receive the beacon regularly. They analyze the TIM field included in the beacon, and identify whether or not data to be transmitted to the STAs are buffered in the AP. This TIM field is one of the fields included in the frame body of the beacon frame.

The TIM field includes a DTIM count field, a DTIM period field, a bitmap control field, and a partial virtual bitmap field.

The partial virtual bitmap field is formed of 251 bytes (2008 bits). Each bit indicates each STA, and whether data to be transmitted to each STA are stored in the AP according to a value established for each bit.

For example, if a value of an nth bit is established as '0', it means that data to be transmitted to the STA having an Association ID (AID) of n is not stored in the AP. Here, the AID is an identifier assigned to the STA by the AP when the STA is registered in the AP for interworking with the AP. According, the AID being n means that the ID of the STA is n.

Accordingly, when the AP stores data to be transmitted to an arbitrary STA, the AP establishes a bit value of the partial virtual bitmap corresponding to the STA as '1'. Each STA analyzes the TIM in the beacon frame, and reads the bit value of the partial virtual bitmap corresponding to the STA. If the bit value is established as '1', the STA determines that the AP has data to be transmitted to the STA, and then transmits the PS-POLL frame to the AP in order to request that the data be transmitted to the STA.

If the AP receives the PS-POLL frames from the STAs, the AP transmits the data corresponding to the STA stored in it to relevant STAs.

When the Delivery Traffic Indication Message (referred to as a DTIM) counter field is established as '0', the TIM is specially called a DTIM. The DTIM is used to transmit a broadcast frame or a multicast frame. That is, the AP transmits the DTIM carried on the beacon frame to the STA before transmitting the broadcast frame or the multicast frame to the STA.

Accordingly, when an STA in the power-save mode is awaken in accordance with the listen interval, it listens to the beacon frame from the AP and finds the DTIM from the beacon frame. The STA maintains the awake state in order to receive the broadcast frame or the multicast frame transmitted from the AP.

After the STA receives the broadcast frame or the multicast frame from the AP in the awake state, the STA returns to the doze state again.

The DTIM period field indicates the number of the TIM period among the continuous DTIMs. That is, when the DTIM period is established as a decimal '3', it indicates that the DTIM appears once in the beacon frame after the TIM appears three times.

An actual deep sleep mode of the STA cannot be implemented by a power management mode of the conventional AP.

It is noted that an interval between a TIM and the next TIM is called a Beacon-Interval, and the intervals of three TIMs form a DTIM interval. The AP transmits the beacon to each STA every beacon time. "Busy Medium" indicates that the transmission medium is being used, and "Buffered Frame" indicates a buffered frame. That is, an identical bar occurring every beacon time means that a fixed beacon frame is transmitted every beacon time, and something appearing after the beacon frame indicates buffered data. Thus, data following the beacon frame including the DTIM are the multicast data or the broadcast data, and data following the beacon frame including the TIM indicates data to be transmitted to a relevant STA. In addition, each Busy Medium appearing in each of the 2nd, 3rd and 5th beacon frames indicates that the transmission medium is being used as all data which are to be transmitted have not been transmitted. Accordingly, it is noted that beacons are transmitted in such a state that they are delayed little by little relative to the fixed beacon interval.

The STA is awaken at a time corresponding to the beacon time.

When an STA is operating in the sleep mode, even though the STA should actually operate in the sleep mode continuously, an actual sleep mode of the STA cannot be continued since the STA is awaken by the TIM.

As described above, the STA receives the beacon frame during the listen interval time. If it is known that data are buffered in the AP by analyzing the TIM field, the Power Save-Poll (PS-Poll) frame is transmitted to the AP. Accordingly, the AP transmits the buffered data to the STA in response to the PS-Poll frame.

On the other hand, the STA in the power-save mode is awaken from the doze state every listen interval, and receives the beacon frame transmitted from the AP, and the broadcast (BC) or the multicast (MC) as well.

Accordingly, when the AP sends out the BC/MC every DTIM interval, as the STA is awaken in the DTIM interval and receives the BC/MC data, it cannot enter the deep sleep mode.

The term "deep sleep mode" means that even an RF and MAC firmware can enter the sleep mode, and they can be awaken at the listen time of the STA only and receive data transmitted from the AP.

In order to perform the power saving mode, clients should enter the deep sleep mode. Since a number of BC or MC occur in an Ethernet environment, it is not possible to enter the deep sleep mode substantially.

The following patents are considered to be generally pertinent to the present invention, but are burdened by the disadvantages set forth above: U.S. Pat. No. 6,707,867 to Diepstraten et al., entitled WIRELESS LOCAL AREA NETWORK APPARATUS, issued on Mar. 16, 2004; U.S. Pat. No. 5,465,392 to Baptist et al., entitled APPARATUS AND METHOD FOR OPERATING A WIRELESS LOCAL AREA NETWORK HAVING POWER CONSERVATION, issued on Nov. 7, 1995; U.S. Pat. No. 5,450,616 to Rom, entitled METHOD AND APPARATUS FOR POWER CONTROL IN A WIRELESS LAN, issued on Sep. 12, 1995; U.S. Pat. No. 6,067,297 to Beach, entitled EMBEDDED ACCESS POINT SUPPORTING COMMUNICATION WITH MOBILE UNIT OPERATING IN POWER-SAVING MODE, issued on May 23, 2000; and U.S. Pat. No. 6,192,230 to van Bokhorst et al., entitled WIRELESS DATA COMMUNICATION SYSTEM HAVING POWER SAVING FUNCTION, issued on Feb. 20, 2001.

SUMMARY OF THE INVENTION

It is an object of the present invention to provide a method for performing a data transmission process of an AP supporting a power management of a WLAN client, and an AP for implementing the same, wherein an STA extends the time for maintaining the idle state of a PDA or voice/data terminal so that a user can use the terminal for a long time while moving and carrying them by solving the problem that the STA cannot enter the sleep mode due to BC/MC data on the Ethernet without having data to be transmitted to the STA and saving power consumption.

As an embodiment according to the present invention, a method for performing a data transmission process of an AP supporting power management of WLAN clients performing a power-save mode comprises the steps of: when arbitrary data are received through a network, storing data selectively, wherein the received data are not stored in a memory if its current operation timing is in a first timing interval, and the received data are stored in the memory if its current operation timing is in a second timing interval; generating a beacon frame to inform the WLAN clients of whether data to be transmitted to the WLAN clients are stored in the memory after determining whether data to be transmitted to the WLAN clients are stored in the memory according to a beacon frame generation interval; and transmitting the generated beacon frame to the WLAN clients every beacon interval.

As another embodiment of the present invention, the present invention provides a method for performing a data transmission process of an AP supporting power management of WLAN clients performing a power-save mode, comprising the steps of: establishing a period composed of a first timing interval including M number of DTIM intervals, and a second timing interval including N number of DTIM intervals; discarding multicast or broadcast data received through a network during the first timing interval; buffering the multicast or broadcast data received through the network during the second timing interval; transmitting the buffered data to the WLAN client every period during the second timing interval; and performing the buffering and transmitting step repeatedly (where M and N are natural numbers and M>N).

As another embodiment of the present invention, the present invention provides an AP for supporting power management of WLAN clients performing a power-save mode, comprising: a receiver for receiving data transferred through a network; a memory for storing data selected from data received though the receiver; a beacon generator for determining whether data to be transmitted to the WLAN clients have been stored in the memory according to a beacon frame generation period, and then informing the WLAN clients of whether data to be transmitted to the WLAN clients have been stored in the memory; a transmitter for transmitting to the WLAN clients the data stored in the memory or the beacon frame generated by the beacon generator; and a data processor responsive to arbitrary data being received through the network for storing data selectively, wherein the received data are not stored in the memory if its current operation timing is in a first timing interval, and the received data are stored in the memory if its current operation timing is in a second timing interval, and for transmitting the beacon frame generated in the beacon generator to the WLAN clients through the transmitter every beacon interval.

As another embodiment of the present invention, the present invention provides an AP for supporting power management of WLAN clients performing a power-save mode, comprising: a receiver for receiving data transferred through a network; a memory for storing data selected from data received though the receiver; a beacon generator for determining whether data to be transmitted to the WLAN clients have been stored in the memory according to a beacon frame generation period, and then informing the WLAN clients as to whether data to be transmitted to the WLAN clients have been stored in the memory; a transmitter for transmitting to the WLAN clients the data stored in the memory or the beacon frame generated by the beacon generator; and a data processor for establishing a period composed of a first timing interval, including M number of DTIM intervals, and a second timing interval, including N number of DTIM intervals, for discarding multicast or broadcast data received through a network during the first timing interval, for buffering the multicast or broadcast data received through the network during the second timing interval, and for transmitting the beacon frame generated in the beacon generator to the WLAN clients through the transmitter every beacon interval (where M and N are natural numbers and M>N).

BRIEF DESCRIPTION OF THE DRAWINGS

The above and other features and advantages of the present invention will become more apparent to those of ordinary skill in the art as a result of the detailed description set forth below of preferred embodiments thereof with reference to the attached drawings, in which:

FIG. 3 is a diagram showing a combination of a type field and a subtype field.

FIG. 4 is a diagram showing various kinds of information included in a frame body of a beacon frame.

FIG. 5 is a detailed diagram of a TIM field.

DETAILED DESCRIPTION OF THE PREFERRED EMBODIMENTS

Figure 1:
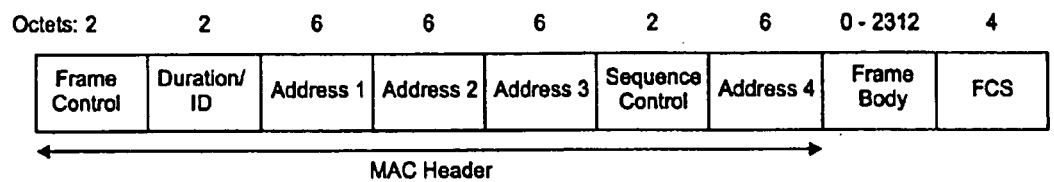
FIG. 1 is a diagram showing the form of a MAC frame of the IEEE 802.11 standard.

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and fully convey the scope of the invention to those skilled in the art. In the drawings, the thickness of layers and regions are exaggerated for clarity. Like numbers refers to like elements throughout the specification.

FIG. 1 is a diagram showing the form of a MAC frame of the IEEE 802.11 standard.

Referring to FIG. 1, each MAC frame consists of a MAC header, a frame body having information specific to frame types, and a frame check sequence (FCS).

The MAC header consists of a frame control field, a duration field, an address field, and a sequence control field. The frame control field is a field indicating a property of the field, and it is possible to get information as to the property of the frame and the power management by analyzing the frame control field. Accordingly, the AP and the STA can identify the state of the other party by analyzing the frame control field among the frames that are sent out and received with each other.

Figure 2:
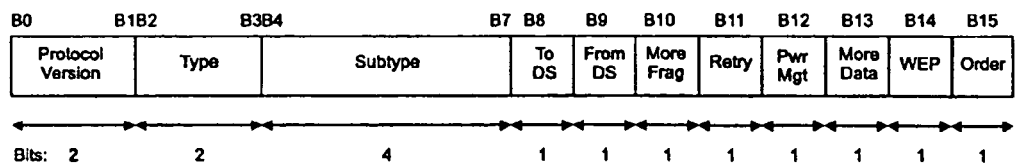
FIG. 2 is a detailed diagram of a frame control field shown in FIG. 1.

FIG. 2 is a detailed diagram of the frame control field shown in FIG. 1.

Referring to FIG. 2, the frame control field consists of a protocol version field, a type field, a subtype field, a To DS field, a From DS field, a More Fragments field, a Retry field, a Power management field, a More Data field, a Wired Equipment Privacy (WEP) field, and an Order field.

Among the fields, the type field is formed of 2 bits, and the subtype field is formed of 4 bits. The type and subtype fields indicate the property of the frame. That is, each frame is mainly divided into a control frame, a data frame and a management frame in view of its property.

FIG. 3 is a diagram showing a combination of the type field and the subtype field.

Referring to FIG. 3, in accordance with values established in the type field and the subtype field, it is possible to identify the function of each frame.

Among them, when the value of the type field is '00' and the value of the subtype field is '1000', the frame is identified as a Beacon frame.

FIG. 4 is a diagram showing various kinds of information included in a frame body of a Beacon frame.

Referring to FIG. 4, the Beacon frame includes information as to a time stamp, a beacon interval, capability information, an SSID, supported rates, an FH parameter set, a DS parameter set, a CF parameter set, an IBSS parameter set, and a TIM (Traffic Indication Map).

Each piece of information included in the beacon frame has its function. Since information included in the beacon frame is explained in the IEEE 802.11 standard, a detailed explanation of the beacon frame is omitted, and only elements of information directly related to the present invention will be explained.

The time stamp, among the information included in the beacon frame, is used to perform synchronizations between an AP and each STA in the WLAN. The AP periodically transmits the beacon frame to each STA in order to synchronize each STA. A period during which the beacon frame is transmitted is called a beacon interval, and the time during which the beacon frame is transmitted is called a beacon time.

Each STA periodically receives the beacon frame from the AP, and analyzes a time stamp included in the beacon frame. In addition, the STA matches its own timer with the time stamp provided by the AP, and then updates itself. Accordingly, synchronization among STAs is performed.

On the other hand, since the main purpose of the wireless LAN is to provide a service to a mobile node, which normally depends on a battery, the efficient use of transmission and receiving power becomes an important consideration for the MAC protocol.

The IEEE 802.11 standard supports a power management mode for minimizing power consumption by the STA.

In the latter regard, each STA may be in one of two different power states, an awake state or a doze state. The awake state is a state in which the STA fully uses power, and the doze state is a state in which the STA cannot transmit or receive signals, and thus uses very little power.

Transition of the STA between the two states is determined by a power management mode of the STA.

The power management mode of the STA is divided into two modes, an active mode (AM) and a power-save mode (PM).

In the active mode, the STA is in and maintains an awake state so that it can always receive the frames.

In the power-save mode, the STA maintains the doze state, transitions to the active state by supplying power just before the beacon frame is transmitted in order to listen to the frame beacon periodically transmitted from the AP, and then returns to the doze state. These processes are iterated periodically in the power-save mode.

A period during which the STA is in the awake state for a while in order to listen to the beacon frame after the STA is in the doze state by performing the power-save mode is called a listen interval.

On the other hand, the AP stores data to be transmitted to the STA operating in the power-save mode, and periodically transmits the data only at a fixed time instead of transmitting the data arbitrarily.

That is, the AP transmits the beacon frame to the STA at the beacon time every beacon interval described above, the beacon frame being the data stored at the beacon time.

Accordingly, the beacon interval is identical to a listen interval. However, in order that the STA listen to the beacon frame, the STA has to maintain the awake state some extent before the beacon time when the beacon frame is transmitted from the AP. Thus, the STA is periodically awaken from the doze state to the awake state somewhat before the beacon time.

The STA is awaken from the doze state to the awake state for a time every listen interval, and listens to the beacon frame periodically transmitted from the AP every beacon interval. The STA also analyzes a TIM included in the beacon frame, and identifies whether or not the data to be transmitted to the STA is stored in the AP.

As a result of analyzing the TIM, when AP has the data to be transmitted to the STA, the STA transmits a PS-POLL frame to the AP to request the stored data. Accordingly, the AP transmits the data of the STA stored in the AP to the STA which transmitted the PS-POLL frame to the AP.

On the other hand, as a result of analyzing the TIM, when the AP has not stored data to be transmitted to the STA, the STA returns to the doze state from the awake state.

It is because the AP has its own timer, capable of counting a beacon interval, that the AP can transmit the beacon frame to the STA every beacon interval. Also, it is because the STA has its own timer, capable of counting the listen interval, that the STA is awaken from the doze state to the awake state every listen interval.

The STA establishes its own timer again by referring to a time stamp provided by the beacon frame. Accordingly, synchronization among STAs is performed.

The AP does not transmit data to be transmitted to the STA whenever the data are generated in order to give support to the STA performing the power-save mode. At first, the AP includes information, as to the fact that the AP has data stored in it, in the beacon frame which is transmitted to the STA every beacon interval, and transmits it to the STA. The beacon frame has the TIM field for including such information.

The TIM field is a field indicating that data to be transmitted to a specific STA is stored in the AP.

Accordingly, when the AP stores data to be transmitted to the STAs, the AP informs the STA that data to be transmitted through the TIM at the beacon time are buffered.

As a result, the STAs analyze the TIM received from the AP at the beacon time. Simultaneously, the STAs operating in the power-save mode (referred to as a PS mode, hereinafter) are awaken in a listen interval time, and receive the beacon regularly. They analyze the TIM field included in the beacon, and identify whether or not the data to be transmitted to the STAs are buffered in the AP. This TIM field is one of the fields included in the frame body of the beacon frame, as shown in FIG. 5.

FIG. 5 is a detailed diagram of a TIM field.

Referring to FIG. 5, the TIM field includes a DTIM count field, a DTIM period field, a bitmap control field, and a partial virtual bitmap field.

The partial virtual bitmap field is formed of 251 bytes (2008 bits). Each bit indicates each STA, and whether data to be transmitted to each STA are stored in the AP according to a value established for each bit.

For example, if a value of an nth bit is established as '0', it means that data to be transmitted to the STA having an Association ID (AID) of n is not stored in the AP. Here, the AID is an identifier assigned to the STA by the AP when the STA is registered in the AP for interworking with the AP. According, the AID being n means that the ID of the STA is n.

Accordingly, when the AP stores data to be transmitted to an arbitrary STA, the AP establishes a bit value of the partial virtual bitmap corresponding to the STA as '1'. Each STA analyzes the TIM in the beacon frame, and reads the bit value of the partial virtual bitmap corresponding to the STA. If the bit value is established as '1', the STA determines that the AP has data to be transmitted to the STA, and then transmits the PS-POLL frame to the AP in order to request that the data be transmitted to the STA.

If the AP receives the PS-POLL frames from the STAs, the AP transmits the data corresponding to the STA stored in it to relevant STAs.

When the Delivery Traffic Indication Message (referred to as a DTIM) counter field is established as '0', the TIM is specially called a DTIM. The DTIM is used to transmit a broadcast frame or a multicast frame. That is, the AP transmits the DTIM carried on the beacon frame to the STA before transmitting the broadcast frame or the multicast frame to the STA.

Accordingly, when an STA in the power-save mode is awaken in accordance with the listen interval, it listens to the beacon frame from the AP and finds the DTIM from the beacon frame. The STA maintains the awake state in order to receive the broadcast frame or the multicast frame transmitted from the AP.

After the STA receives the broadcast frame or the multicast frame from the AP in the awake state, the STA returns to the doze state again.

The DTIM period field indicates the number of the TIM period among the continuous DTIMs. That is, when the DTIM period is established as a decimal '3', it indicates that the DTIM appears once in the beacon frame after the TIM appears three times.

Figure 6:
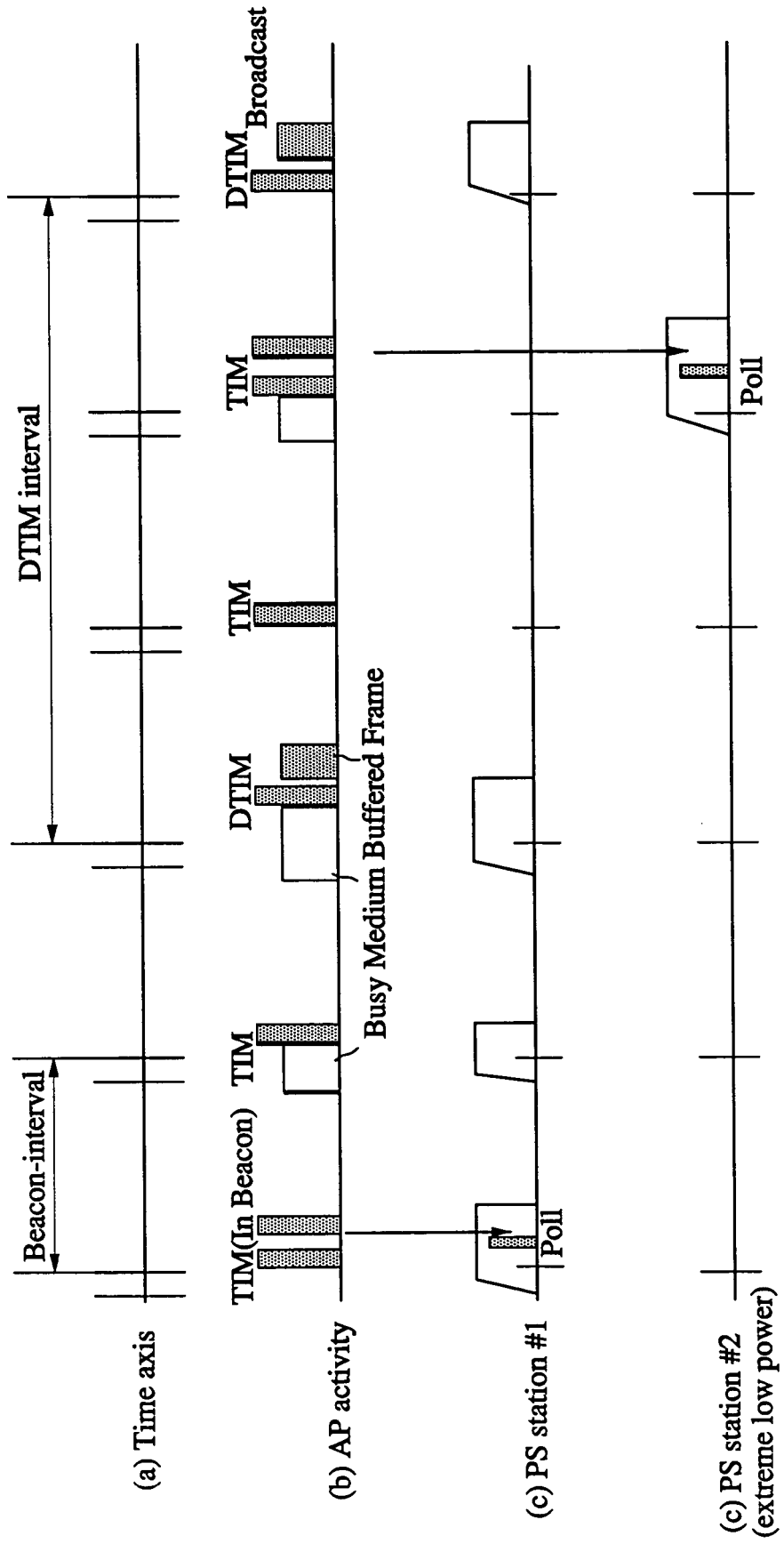
FIG. 6 is a diagram used to explain that an actual deep sleep mode in an STA cannot be implemented in a power control mode of a conventional AP.

FIG. 6 is a diagram used to explain that an actual deep sleep mode in an STA cannot be implemented by a power management mode of a conventional AP.

Referring to FIG. 6, (a) indicates time, (b) indicates an operation of the AP, and (c) and (d) indicate an operation of the STA. In the figures, it is noted that an interval between a TIM and the next TIM is called a Beacon-Interval, and the intervals of three TIMs form a DTIM interval. Referring to (b), the AP transmits the beacon to each STA every beacon time. In the drawings, "Busy Medium" indicates that the transmission medium is being used, and "Buffered Frame" indicates a buffered frame. That is, an identical bar occurring every beacon time means that a fixed beacon frame is transmitted every beacon time, and something appearing after the beacon frame indicates buffered data. Thus, data following the beacon frame including the DTIM are the multicast data or the broadcast data, and data following the beacon frame including the TIM indicates data to be transmitted to a relevant STA. In addition, each Busy Medium appeared in each of the 2nd, 3rd and 5th beacon frames indicates that the transmission medium is being used, as all data which are to be transmitted have not been transmitted. Accordingly, it is noted that beacons are transmitted in such a state that they are delayed little by little relative to the fixed beacon interval.

Referring to (c), the STA is awaken in correspondence to the beacon time.

In the case of (d), there is shown an STA operating in a sleep mode. Even though the STA should actually operate in the sleep mode continuously, an actual sleep mode of the STA cannot be continued since the STA is awaken by the TIM as shown in the drawings.

As described above, the STA receives the beacon frame during the listen interval time. If it is known that data are buffered in the AP by analyzing the TIM field, the PS-Poll (Power Save-Poll) frame is transmitted to the AP. Accordingly, the AP transmits the buffered data to the STA in response to the PS-Poll frame.

On the other hand, the STA in the power-save mode is awaken from the doze state every listen interval, and receives the beacon frame transmitted from the AP and the broadcast (BC) or the multicast (MC).

Accordingly, when the AP sends out the BC/MC every DTIM interval, as the STA is awaken in the DTIM interval and receives the BC/MC data, it cannot enter the deep sleep mode.

The term "deep sleep mode" means the case in which even an RF and MAC firmware can enter the sleep mode, and they can be awaken at the listen time of the STA only and receive data transmitted from the AP.

In order to perform the power saving mode, clients should enter the deep sleep mode. Since a number of BC or MC occur in an Ethernet environment, it is not possible to enter the deep sleep mode substantially.

Figure 7:
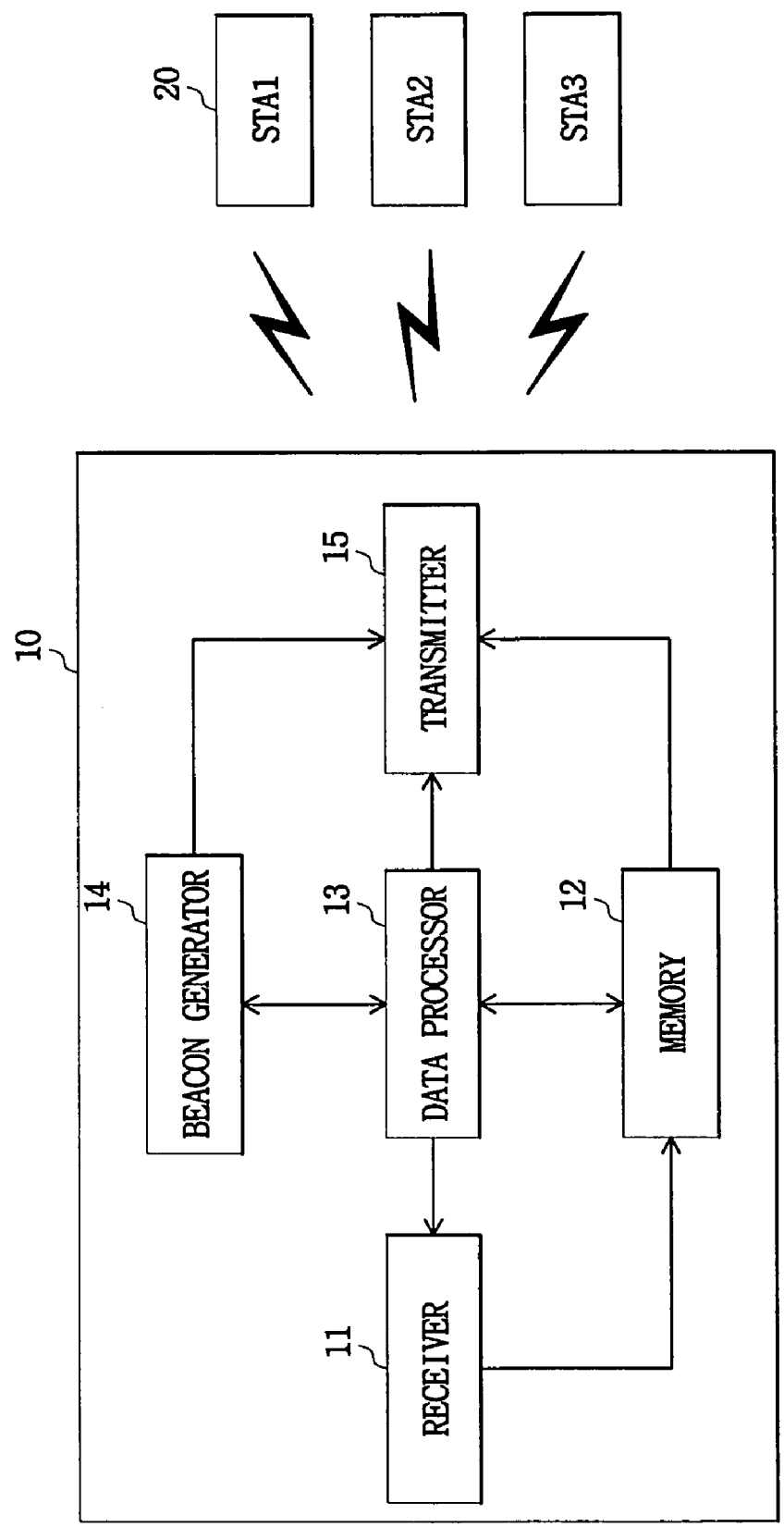
FIG. 7 is a block diagram of an AP in accordance with an embodiment of the present invention.

FIG. 7 is a block diagram of an AP in accordance with an embodiment of the present invention.

Referring to FIG. 7, an AP 10 communicating with a number of STAs 20 operating in a power saving mode includes a receiver 11, a memory 12, a data processor 13, a beacon generator 14, and a transmitter 15.

The receiver 11 receives data from an Ethernet or an arbitrary STA 20. Data received through the Ethernet include multicast data and broadcast data.

The memory 12 stores data received through the receiver 11. When the data are received through the receiver 11, they are stored in the memory 12, and are then transmitted to the STA 20 every beacon interval.

The beacon generator 14 generates a beacon frame to be transmitted to the STA 20 every beacon interval. The beacon frame generated in the beacon generator 14 includes a TIM and a DTIM. Accordingly, the STA 20 in a power-save mode is awaken from a doze state every listen interval, and receives the beacon frame transmitted from the AP 10 at the beacon interval.

The transmitter 15 transmits data stored in the memory 12 or the beacon generated by the beacon generator 14 to the STA 20 every beacon interval.

The data processor 13 establishes a period consisting of a first timing interval, including M number of DTIM intervals, and a second timing interval, including N number of DTIM intervals, discards data received through the receiver 11 during the first timing interval, buffers data received through the receiver 11 during the second timing interval in the memory 12, and then transmits the buffered data to the STA 20 through the transmitter 15 every period or every beacon interval.

Hereinafter, a method for processing of data in the data processor 13 when the values of M and N are 4 and 1, respectively, is explained.

The data processor 13 establishes five DTIM intervals for the DTIM generated in the beacon generator 14 as one beacon interval.

Presume that five DTIM intervals are established as one period, the first four DTIM intervals being established as a first timing interval, and the fifth DTIM period being established as a second timing interval. First of all, during the first timing interval, multicasting or broadcasting data received from networks, such as an Intranet, the Ethernet and an Internet, are not buffered in the memory 12, but are discarded.

However, multicasting and broadcasting data received in the second timing interval are buffered in the memory 12.

The buffered data are transmitted to the STA 20 after the beacon frame, including the DTIM, is sent out.

Taking advantage of a property of broadcasting, the AP 10 establishes the five DTIM periods as one beacon interval, wherein the BC/MC data are discarded in the first four DTIM intervals, and the BC/MC data received during the last DTIM interval are buffered, and then transmitted to the STA 20.

Of course, the AP 10 can transmit the beacon frame to the STA 20 every beacon interval during the first or second timing interval.

However, since the data are not stored in the memory 12 during the first timing interval and so there is no data to be transmitted, the value established for the bits of a partial virtual bitmap of the TIM field included in the beacon frame is established as '0'. Even though the beacon frame is transmitted to the STA 20 every period, there is no multicast or broadcast data stored.

Accordingly, each of the STAs 20 is awaken every listen interval, then returns to the doze state after listening to the beacon frame, and thereby achieves a substantial sleep mode as a result of that process.

The beacon frame, including the TIM, is transmitted every beacon interval to each STA 20 during the second timing interval. When an arbitrary STA 20 transmits the PS-POLL frame, the data stored in the memory 12 is transmitted to the appropriate STA 20.

Figure 8:
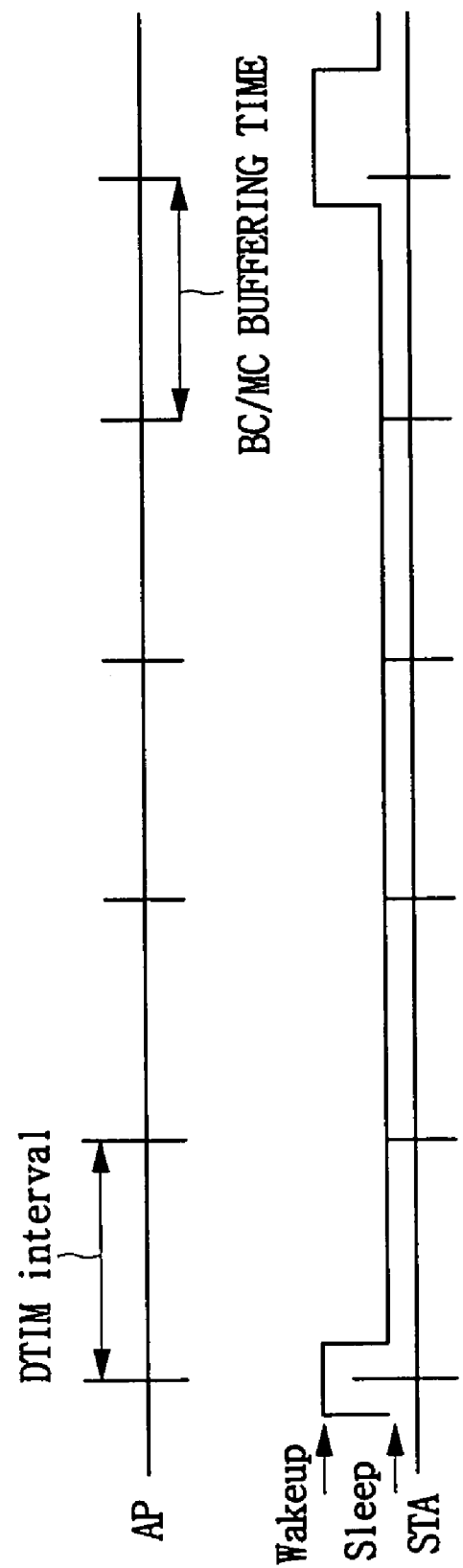
FIG. 8 is a diagram showing the operational states of an AP and an STA in accordance with the operation of the AP shown in FIG. 7.

FIG. 8 is a diagram showing the operational states of an AP and the STA in accordance with the operation of the AP shown in FIG. 7.

Referring to FIG. 8, it is shown that the STA 20 maintains a sleep state during five DTIM intervals. The five DTIM intervals are established as one period in the AP 10. The DTIM interval is established as a number of TIM intervals.

For example, the DTIM interval appears as shown in FIG. 6, wherein a DTIM interval appears every third TIM interval. In addition, the STA 20 is awaken every listen interval and is kept awake for a period of time, then returning to the sleep state when there is no data to receive. Thus, the STA 20 is regarded as being in the sleep mode almost continuously since the time during which the STA is kept awake during every listen interval is very short.

The AP 10 establishes five DTIM intervals as one period, wherein the multicast or broadcast data received from the networks, such as the Infranet, the Ethernet and the Internet, during the first four DTIM intervals are not buffered but are discarded. Conversely, the multicast or broadcast data received during the fifth DTIM interval (BC/MC Buffering time) are buffered.

The AP 10 then transmits the buffered data to the STA 20 every period after transmitting the beacon frame, including the DTIM.

Taking advantage of a property of broadcasting, the AP 10 divides the five DTIM intervals into two timing intervals, discards the BC/MC data in the first four DTIM intervals, buffers the BC/MC data received in the fifth DTIM interval, and then transmits the data to the STA 20.

Generally, it is not expected that all data be exactly transmitted when a wireless network system controlling the broadcast or multicast data transmits data to another system participant. This is because there are too many possible causes of data loss between a transmission system and the other system participant. Therefore, data to be transmitted from the transmission system should be formed with complementary measures for such data loss.

Accordingly, there is no problem in data communication even though the data are divided in accordance with an arbitrary ratio, for example, 4:1 as shown in FIG. 3, the data corresponding to 4 being discarded, and the data corresponding to 1 being stored for transmission to the relevant STA.

That is, there is no problem even though arbitrary data are discarded periodically so long as the transmission quality is guaranteed. This is because the data loss at that level may be caused by other factors.

Furthermore, it is because arbitrary data can be recovered since there are former data and latter data in view of the property of data.

When the AP 10 transmits data to each STA 20, if the AP 10 can transmit the multicast data or the broadcast data to the STA 20 not during every DTIM interval, but only during a selected DTIM interval within a period, the STA 20 can certainly maintain its sleep mode during the remaining portion of the period.

That is, during those intervals wherein the multicast data or the broadcast data are not transmitted, a predetermined sleep duration time is guaranteed since there is no multicast data or broadcast data transmitted from the AP 10, even though the STA 20 is awaken for a short time during every period.

In the embodiment of the present invention, the ratio of discarding and storing data is preferably 4:1 during a single period. However, the ratio may be differently established in a permitted range of transmission quality, and is not limited to 4:1. For example, the discard ratio may be increased in the case of voice data, and the ratio may be decreased in the case of data communication, in order to maintain transmission quality.

Just as the time during which the STA 20 can operate in the sleep mode is determined in accordance with the ratio, the time during which the ultimate sleep mode is maintained is also determined, so that effective power saving can be achieved.

In accordance with the present invention, if five DTIM intervals (one interval being 1 to 1.6 seconds) are established as one period, and BC/MC received in an AP 10 during four of the DTIM intervals is discarded while BC/MC received in the AP 10 during a fifth DTIM interval is transmitted, the STA 20 can certainly stay in the sleep mode during four DTIM intervals every period, so that a saving of power consumption can be achieved.

For example, when a battery of 1000 mAh was used in an STA 20, and multicast data and broadcast data were used every DTIM period in accordance with the conventional power management method, idle time was 12.5 hours and talk time was 2.5 hours. This is a result achieved after a maximum value and a minimum value among 10 samples were discarded, and the remaining ones were averaged.

On the other hand, according to a method for managing power in accordance with the present invention, as a result of buffering broadcast data or multicast data received only during one DTIM interval among five DTIM periods and then transmitting the buffered data once during a period, the idle time in the STA 20 was extended almost two times.

Thus, as a result of the latter test, the idle time was 24 hours and the talk time was 2.5 hours, and it was thereby confirmed that the talk time did not change but the idle time was considerably extended. This indicates that there were many intervals during which the STA 20 was in a deep sleep mode.

Although preferred embodiments of the present invention have been described, it will be understood by those skilled in the art that the present invention should not be limited to the described preferred embodiments. Rather, various changes and modifications can be made within the spirit and scope of the present invention, as defined by the following claims.

What is claimed is:

1. A method for performing a data transmission process of an access point (AP) supporting power management of a wireless local area network (WLAN) client performing a power-save mode, comprising the steps of:

when data are received through a network, storing the data selectively wherein received data are not stored in a memory when a current operation thereof occurs in a first timing interval, and wherein the received data are stored in the memory when the current operation thereof occurs in a second timing interval;

generating a beacon frame to inform the WLAN client as to whether data to be transmitted to the WLAN client are stored in the memory after determining whether the data to be transmitted to the WLAN client are stored in the memory according to a beacon frame generation interval; and transmitting a generated beacon frame to the WLAN client every beacon interval.

2. The method according to claim 1, wherein the first timing interval includes M number of delivery traffic indication message (DTIM) intervals, the second timing interval includes N number of the DTIM intervals, and the first and the second timing intervals are established to form one period, and wherein M and N are natural numbers.

3. The method according to claim 2, wherein M is 4 and N is 1.

4. The method according to claim 1, comprising the steps of:

establishing a period which comprises the first timing interval, including M number of delivery traffic indication message (DTIM) intervals, and the second timing interval, including N number of the DTIM intervals, wherein M and N are natural numbers and M is greater than N;

discarding multicast data and broadcast data received through the network during the first timing interval;

buffering the multicast data and the broadcast data received through the network during the second timing interval; and transmitting the buffered data to the WLAN client every period during the second timing interval.

5. A method for performing a data transmission process of an access point (AP) supporting power management of a wireless local area network (WLAN) client performing a power-save mode, comprising the steps of:

establishing a period which comprises a first timing interval, including M number of delivery traffic indication message (DTIM) intervals, and a second timing interval, including N number of the DTIM intervals;

discarding multicast data and broadcast data received through a network during the first timing interval;

buffering the multicast data and the broadcast data received through the network during the second timing interval; and transmitting the buffered data to the WLAN client every period during the second timing interval; and wherein M and N are natural numbers and M is greater than N.

6. A method for performing a data transmission process of an access point (AP) supporting power management of a wireless local area network (WLAN) client performing a power-save mode as set forth in claim 5, comprising the steps of:

when data are received through the network, storing data selectively wherein the received data are not stored in a memory when a current operation thereof occurs in the first timing interval, and wherein the received data are stored in the memory when the current operation thereof occurs in the second timing interval;

generating a beacon frame to inform the WLAN client whether data to be transmitted to the WLAN client are stored in the memory after determining whether the data to be transmitted to the WLAN client are stored in the memory according to a beacon frame generation interval; and transmitting a generated beacon frame to the WLAN client every beacon interval.

7. The method according to claim 6, wherein the first timing interval includes M number of delivery traffic indication message (DTIM) intervals, the second timing interval includes N number of the DTIM intervals, and the first and the second timing intervals are established to form one period, and wherein M and N are natural numbers.

8. A system for performing the method of claim 5, comprising:

a memory responsive to reception of data through the network for storing data selectively, wherein the received data are not stored in the memory when a current operation thereof occurs in said first timing interval, and wherein the received data are stored in the memory when the current operation thereof occurs in said second timing interval;

a data processor for determining whether the data to be transmitted to the WLAN client are stored in the memory according to a beacon frame generation interval;

a beacon generator for generating a beacon frame to inform the WLAN client whether the data to be transmitted to the WLAN client are stored in the memory after determining whether the data to be transmitted to the WLAN client are stored in the memory according to a beacon frame generation interval.

9. A system for performing the method of claim 5, comprising:

a data processor for determining whether the data to be transmitted to the WLAN client are stored according to a beacon frame generation interval;

a beacon generator for generating a beacon frame to inform the WLAN client whether the data to be transmitted to the WLAN client are stored after determining whether the data to be transmitted to the WLAN client are stored; and a transmitter having a first input connected to an output of said data processor and a second input connected to an output of said beacon generator, said transmitter transmitting the generated beacon frame and the data to be transmitted to the WLAN client every beacon interval.

10. An access point (AP) for supporting a power management of a wireless local area network (WLAN) client, comprising:

a receiver for receiving data transferred through a network;

a memory for storing data selected from the data received by the receiver;

a beacon generator for determining whether data to be transmitted to the WLAN client have been stored in the memory according to a beacon frame generation period, and for informing the WLAN client of whether the data to be transmitted to the WLAN client have been stored in the memory;

a transmitter for transmitting at least one of the data stored in the memory and a beacon frame generated by the beacon generator to the WLAN client; and a data processor responsive to the data being received through the network for storing the data selectively, wherein the received data are not stored in the memory when a current operation occurs in a first timing interval, and the received data are stored in the memory when the current operation occurs in a second timing interval, and for transmitting the beacon frame generated by the beacon generator to the WLAN client through the transmitter every beacon interval.

11. The AP according to claim 10, wherein the first timing interval includes M number of DTIM periods, the second timing interval includes N number of the DTIM periods, the first timing interval and the second timing interval are established to form one period, M and N are natural numbers, and M is greater than N.

12. The AP according to claim 10, wherein M is 4 and N is 1.

13. A system for performing a data transmission process of an access point (AP) supporting power management of a wireless local area network (WLAN) client performing a power-save mode, comprising:

storing means responsive to reception of data through a network for storing the data selectively, wherein the received data are not stored in a memory when a current operation thereof occurs in a first timing interval, and wherein the received data are stored in the memory when the current operation thereof occurs in a second timing interval;

determining means for determining whether data to be transmitted to the WLAN client are stored in the memory according to a beacon frame generation interval;

generating means for generating a beacon frame to inform the WLAN client as to whether the data to be transmitted to the WLAN client are stored in the memory after determining whether the data to be transmitted to the WLAN client are stored in the memory according to the beacon frame generation interval; and transmitting means for transmitting a generated beacon frame and the data to be transmitted to the WLAN client every beacon interval.

14. The system according to claim 13, wherein the first timing interval includes M number of delivery traffic indication message (DTIM) intervals, the second timing interval includes N number of the DTIM intervals, and the first and the second timing intervals are established to form one period, and wherein M and N are natural numbers.

15. The system according to claim 14, wherein M is 4 and N is 1.

16. The system according to claim 13, wherein said determining means comprises a data processor, and said generating means comprises a beacon generator connected to said data processor.

17. The system according to claim 16, wherein said transmitting means comprises a transmitter having a first input connected to an output of said data processor and a second input connected to an output of said beacon generator.

18. The system according to claim 17, further comprising receiving means for receiving the data through the network, said receiving means having an input connected to a further output of said data processor, and having an output connected to an input of said storing means.

19. The system according to claim 13, further comprising:

means for establishing a period which comprises the first timing interval, including M number of delivery traffic indication message (DTIM) intervals, and the second timing interval, including N number of DTIM intervals, where M and N are natural numbers and M is greater than N;

means for discarding multicast data and broadcast data received through the network during the first timing interval;

means for buffering the multicast data and the broadcast data received through the network during the second timing interval; and means for transmitting the buffered data to the WLAN client every period during the second timing interval.

20. The system according to claim 19, wherein:

said determining means comprises a data processor, and said generating means comprises a beacon generator connected to said data processor; and said transmitting means comprises a transmitter having a first input connected to an output of said data processor and a second input connected to an output of said beacon generator.

* * * * *